(12) United States Patent
Jordan et al.

(10) Patent No.: US 7,195,234 B2
(45) Date of Patent: Mar. 27, 2007

(54) ADJUSTABLE GAS SPRING SUSPENSION SYSTEM

(75) Inventors: Brian T. Jordan, Chicago, IL (US);
Christopher A. Shipman, Chicago, IL (US); John D. Cheever, Chicago, IL (US); Steven J. Olds, Colorado Springs, CO (US)

(73) Assignee: SRAM Corporation, Chicago, IL (US)

( * ) Notice: Subject to any disclaimer, the term of this patent is extended or adjusted under 35 U.S.C. 154(b) by 375 days.

(21) Appl. No.: 10/724,279

(22) Filed: Nov. 28, 2003

(65) Prior Publication Data
US 2005/0116399 A1    Jun. 2, 2005

(51) Int. Cl.
*F16F 5/00* (2006.01)

(52) U.S. Cl. ............... 267/64.11; 280/276; 280/284

(58) Field of Classification Search ........... 280/276, 280/284, 283, 279, 275; 267/64.11, 61.15, 267/113, 226, 64.26; 188/285, 299.1, 319.2, 188/322.13
See application file for complete search history.

(56) References Cited

U.S. PATENT DOCUMENTS 6,095,541 A * 8/2000 Turner et al. ........... 280/276
6,343,807 B1   2/2002 Rathbun
6,592,136 B2 * 7/2003 Becker et al. ........... 280/276

FOREIGN PATENT DOCUMENTS

DE    201 20 257 U1    3/2002
EP    1 079 139         2/2001

OTHER PUBLICATIONS

Fox Racing Shox 2003 Product Catalog, 2002, pp. 17 and 18, Fox Factory, Inc., United States.

* cited by examiner

*Primary Examiner*—Douglas C. Butler
(74) *Attorney, Agent, or Firm*—Milan Milosevic; Lisa Wunderlich

(57) ABSTRACT

A gas spring suspension system that adjusts the spring rate as the travel is adjusted. The suspension system includes a frame, a pressure chamber, a compression piston assembly, an adjustment assembly, a piston tube, and a shaft. The piston tube is operatively connected to the adjustment assembly and the compression piston assembly, and the compression piston assembly is configured to slidably displace along the piston tube to change the pressure in the pressure chamber. The adjustment assembly is associated with the frame and is operable to axially position the piston tube and, in turn the compression piston assembly, relative to the frame to adjust the travel of the suspension system. The shaft is configured to be variably positionable within the pressure chamber in response to axial displacement of the piston tube and the compression piston assembly by the adjustment assembly, the variable positioning of the shaft within the pressure chamber changing the pressure therein.

15 Claims, 11 Drawing Sheets

ADJUSTABLE GAS SPRING SUSPENSION SYSTEM

BACKGROUND OF THE INVENTION

The present invention relates to gas spring suspension systems and more particularly to a gas spring suspension system that adjusts the spring rate as the travel is adjusted.

Bicycles include suspension systems to cushion the rider from irregularities in the terrain. Bicycle suspension systems are typically located at the front and rear forks, the seat tube, or at other bicycle frame locations. A typical front suspension fork includes two legs, each leg having inner and outer telescoping tubes. At least one leg includes a resilient member for biasing the inner and outer tubes apart from each other and for absorbing compressive forces applied to the fork. The resilient member may be a coil spring, an elastomer spring, a gas spring or the like. The maximum amount the tubes may compress relative to each other is commonly referred to as the travel of the fork. Early suspension forks were capable of about 50 mm of travel. However, as riders began to traverse rougher terrain at higher speeds, a greater amount of travel was needed to absorb the higher riding forces. Thus, newer suspension forks were designed with travel settings of 125 mm or more. However, forks with longer travel may be cumbersome to ride, especially when riding uphill, due to the raised front end geometry and the resulting softer spring rate. A rider may choose a fork according to the type of terrain he is going to be traversing. For example, a long travel fork is used for rough downhill terrain, a medium travel fork for flat terrain and a short travel fork for uphill terrain.

Another problem with existing bicycle suspension forks is that they are unnecessarily heavy. Besides increasing the overall weight of the bicycle, the weight of the fork affects the handling of the bicycle. Accordingly, reduced weight is important to riders, particularly to those involved in racing where reduced weight offers an important competitive advantage.

Bicycle suspension systems with adjustable travel have been designed, however, most use a helical compression spring that adds unnecessary weight. To solve this problem, gas spring suspension systems are sometimes used. One problem with existing gas spring forks is that the rider must perform a two-step process to adjust the travel. First, a knob is turned to select the desired travel, and then the fork is manually compressed to the desired travel setting. Therefore, there is a need for a lightweight bicycle suspension system that provides easily adjustable travel that can be optimized for downhill, flat and uphill terrain.

SUMMARY OF THE INVENTION

The present invention relates to gas spring suspension systems and more particularly to a gas spring suspension system that adjusts the spring rate as the travel is adjusted. The suspension system includes a frame, a pressure chamber, a compression piston assembly, an adjustment assembly, a piston tube, and a shaft. The piston tube is operatively connected to the adjustment assembly and the compression piston assembly, and the compression piston assembly is configured to slidably displace along the piston tube to change the pressure in the pressure chamber. The adjustment assembly is associated with the frame and is operable to axially position the piston tube and, in turn the compression piston assembly relative to the frame to adjust the travel of the suspension system. The shaft is configured to be variably positionable within the pressure chamber in response to axial displacement of the piston tube and the compression piston assembly by the adjustment assembly, the variable positioning of the shaft within the pressure chamber changing the pressure therein.

The adjustment assembly, by adjusting the position of the shaft within the pressure chamber and the position of the piston assembly along the piston tube, also adjusts the spring rate for a new travel setting. Typically, for a shorter travel setting, a stiffer or higher spring rate is desired, while for a longer travel setting, a softer spring rate is desired. When the adjustment assembly is adjusted to decrease the travel, the shaft further enters the pressure chamber and the piston assembly is displaced or positioned along the piston tube, both displacements decreasing the volume of the pressure chamber to increase the spring rate. Likewise, when the adjustment assembly is adjusted to increase the travel, the shaft is further withdrawn from the pressure chamber and the piston assembly is displaced or positioned in an opposite direction, both displacements increasing the volume of the pressure chamber to decrease the spring rate. Thus, the present invention provides a desirable spring rate at any travel setting without having to separately adjust the gas pressure, allowing riders to change the travel of their forks while riding—on the fly—without having to externally add or remove gas from the pressure chamber. Nonetheless, a valve, attached to the frame and in communication with the pressure chamber, may be included to adjust pressure settings in the pressure chamber as needed.

The gas spring suspension system of the present invention may further include a reserve chamber separated from the pressure chamber by a choke piston. The choke piston is configured to permit restricted gas flow from the pressure chamber to the reserve chamber, and less restricted gas flow from the reserve chamber back to the pressure chamber.

These and other features and advantages of the invention will be more fully understood from the following description of certain embodiments of the invention, taken together with the accompanying drawings.

DETAILED DESCRIPTION

Figure 1:
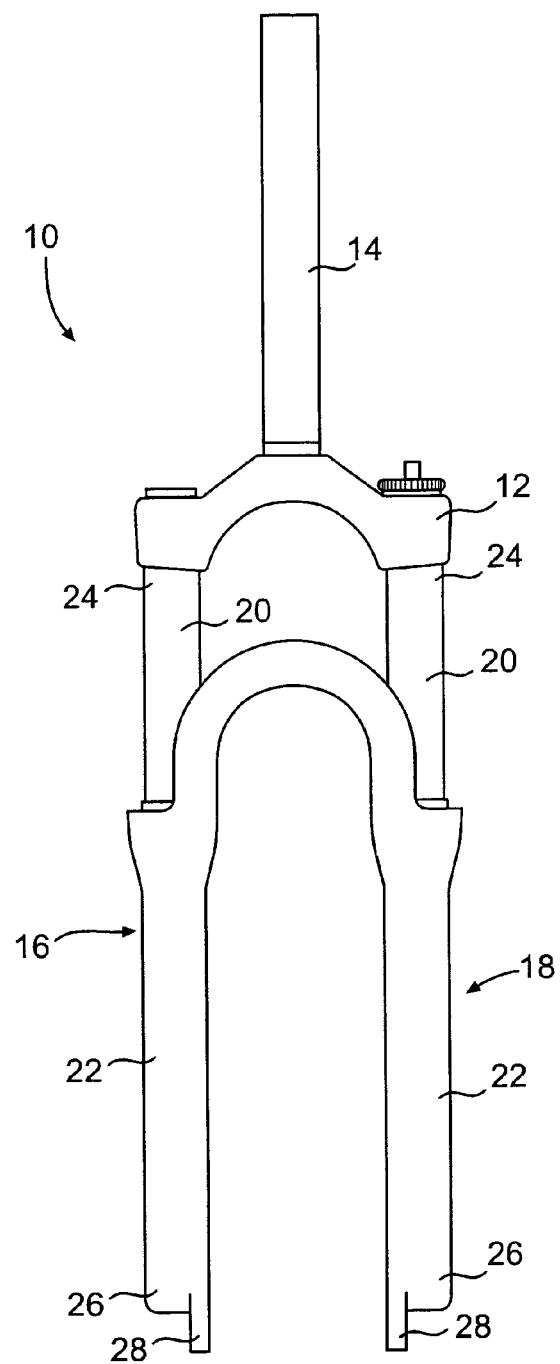
FIG. 1 is a front view of a front gas suspension fork in accordance with one embodiment of the present invention.

FIGS. 1–9 illustrate a bicycle front suspension fork 10 that includes a gas spring suspension system 11 in accordance with one embodiment of the present invention. However, a gas spring suspension system according to the present invention may be used in a rear shock, a seat post, or at other locations on a bicycle frame. Likewise, the gas spring suspension of the present invention may be used on motorcycles as well as other handlebar-steered vehicles. Looking to FIG. 1, the bicycle front suspension fork 10 includes a crown 12 that is connected to a steerer tube 14, a first leg 16 and a second leg 18. Each of the legs 16, 18 include an upper tube 20 and a lower tube 22. Although the upper tubes 20 are shown as inner tubes slidable within the lower outer tubes 22, it will be appreciated that the lower tubes may alternatively be reconfigured as inner tubes slidable within the reconfigured outer tubes. Additionally, although the tubes 20, 22 are shown to have substantially circular cross sections, it is understood that they may be configured to any cross-sectional shape. The inner and outer tubes 20, 22 are connected at their remote ends 24 to the crown 12, and at remote ends 26 to a wheel axle (not shown) through dropouts 28.

Figure 2:
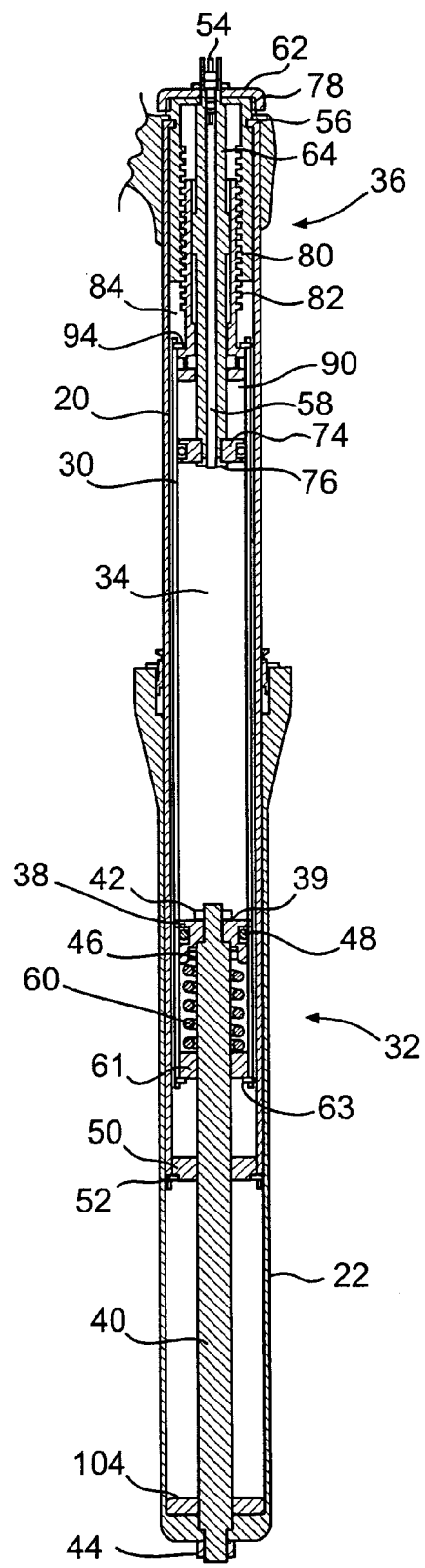
FIG. 2 is a cross-sectional view of one of the legs of the gas suspension fork in FIG. 1.

Looking to FIG. 2, the gas spring suspension system generally includes a piston tube 30, a compression piston assembly 32, a pressure chamber 34 or gas spring for biasing the inner and outer tubes 20, 22 apart from each other, an adjustment assembly 36 for adjusting the travel of the suspension system 11, and a shaft 64 variably positionable in the pressure chamber 34, all configured about a frame member, in this embodiment, the inner tube 20. It is to be understood that although the present invention is described with respect to a front suspension fork, typically including both inner and outer tubes 20, 22, it may also be embodied in a rear suspension fork, typically including a piston assembly sliding within a single piston tube. The piston tube 30 is slidably mounted in the frame or inner tube 20. The piston assembly 32 typically includes a compression piston 38 secured to an end 39 of a piston rod 40 by a retaining ring 42 such that piston 38 is permitted to rotate about the piston rod 40. The piston rod 40 extends through a bottom portion of the inner tube 20 and is secured to the outer tube 22 by a nut 44. The piston 38 has internal and external O-rings 46, 48 that form a gas-tight seal with the piston rod 40 and the piston tube 30, respectively. A bushing 50 is secured proximate the bottom of the inner tube 20 by a retaining ring 52 and serves as a guide for the piston rod 40.

The pressure chamber 34 may be pressurized with gas through a Schrader valve 54 preferably located at one end 56 of the frame or inner tube 20. In the embodiment of FIGS. 1–9, the gas enters the Schrader valve 54 and then flows through a passage 58 before entering the pressure chamber 34. The pressure within the pressure chamber 34 may be adjusted according to the desired stiffness of the suspension fork 10. The pressure within the pressure chamber 34 biases the compression piston 38 against a negative spring 60 located between the piston 38 and a bushing 61 secured to the spring tube 20 by a retaining ring 63.

When the bicycle encounters an impact, the compression piston 38 is displaced upward toward the end 56 of the inner tube 20, against the increasing pressure in the pressure chamber 34, to absorb the impact. After the impact, the compression piston 38 rebounds back toward its initial position against the negative spring 60. The negative spring 60 is shown as a coil spring, but may include other types of springs such as gas springs or elastomer springs.

Figure 3:
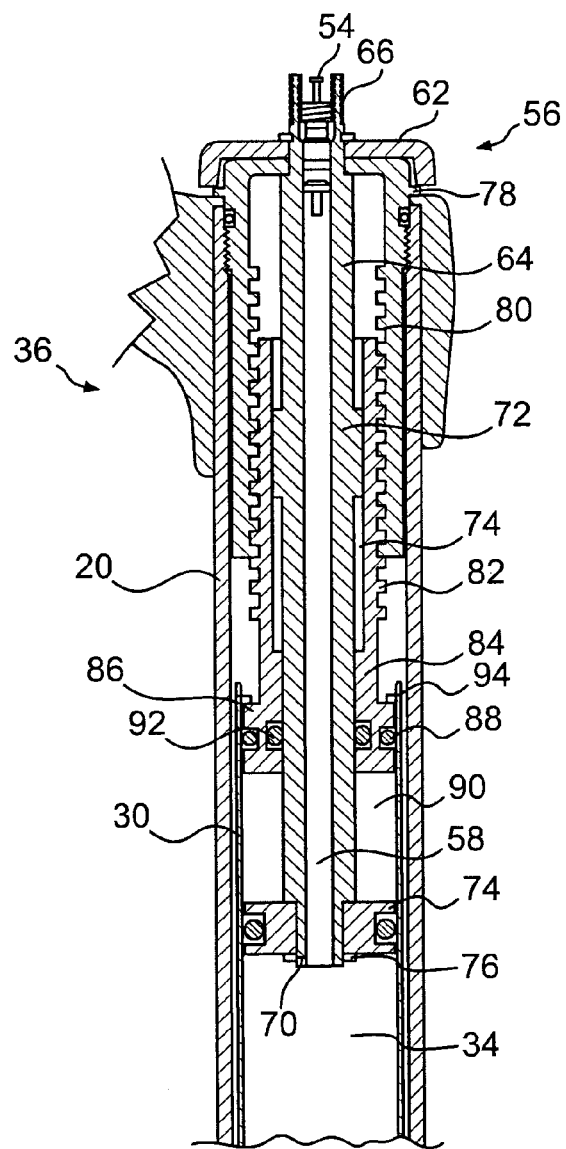
FIG. 3 is a partial cross-sectional view of the leg shown in FIG. 2, showing in particular, an adjustment assembly.
Figure 4:
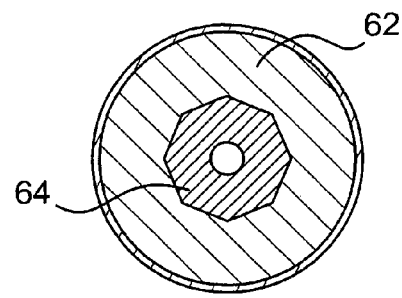
FIG. 4 is a cross-sectional view of the leg shown in FIG. 2, showing in particular, a shaft connected to an actuator or knob.
Figure 5:
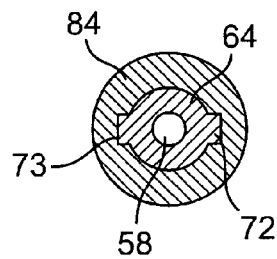
FIG. 5 is a cross-sectional view of the leg shown in FIG. 2, showing in particular, a shaft slidably connected to a follower element.

In the embodiment of FIGS. 1–9, the axial bottom-out distance separating the inner tube 20 from the outer tube 22 is called the travel of the fork, and may be adjusted by operating the adjustment assembly 36 located at the end 56 of the inner tube 20, as shown in FIG. 3. The adjustment assembly 36 may include an actuator, in this embodiment, a knob 62 rotatable in a first direction to position the inner and outer tubes 20, 22 closer together, to reduce the travel of the fork 10, and rotatable in a second direction, to position the inner and outer tubes further apart, to increase the travel of the fork 10. In the embodiment shown, the knob 62 is rotationally fixed to a shaft 64 by cooperating octagonal surfaces formed on the knob 62 and the shaft 64 (see FIG. 4). The adjustment shaft 64 is substantially cylindrical and may be made of aluminum. The Schrader valve 54 is preferably located at an end 66 of the shaft 64 and a choke piston 74 is preferably mounted at another end 70 of the shaft 64 by retaining ring 76. The Schrader valve 54 and choke piston 74 may be alternatively disposed in the suspension fork, so long as they remain in communication with the pressure chamber 34.

The adjustment assembly 36 may further include a driver element 78 rotatable with the actuator 62, in this embodiment, the driver element threaded into the end 51 of the frame or inner tube 20. The driver element 78 further includes threads 80 matingly engaging threads 82 of a follower element 84. The follower element 84 is slidably guided along the shaft 64 with keys 72 formed on the shaft 64 received by slots 73 on the follower element 84 (see FIG. 5). So configured, when the knob 62 is rotated, the follower element 84 is axially displaced by the rotating driver element 78. A lower portion of the follower element 84 may include a cylindrical portion 86 sealing attached to the piston tube 30, with an O-ring 88 providing a seal between the piston tube 30 and the cylindrical portion 86, and an O-ring 92 providing a seal between the shaft 64 and the cylindrical portion 86. The cylindrical portion 86 is secured in the piston tube 30 by an internal retaining O-ring 94. The follower element 84 may be made of a lubricious plastic such as injection molded Delrin. The shaft 64 is configured to extend through a bore 96 of the follower element 84.

Figure 6:
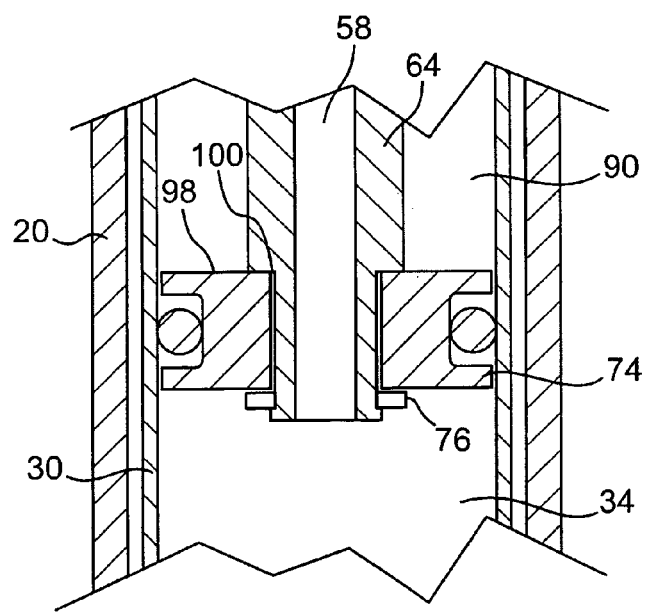
FIG. 6 is a partial cross-sectional view of the leg shown in FIG. 2, showing in particular, a choke piston.

The suspension fork 10 may further include a reserve chamber 90 separated from the pressure chamber 34 by the choke piston 74, also known as a leaky piston. The choke piston is configured to permit restricted gas flow from the pressure chamber 34 to the reserve chamber 90, and less restricted gas flow from the reserve chamber back to the pressure chamber. In the embodiment shown, the gas flow path is between the choke piston 74 and the shaft 64. Referring to FIG. 6, when pressure in the pressure chamber 34 is greater than the pressure in the reserve chamber 90, the choke piston 74 is displaced such that an upper surface 98 of the choke piston 74 contacts a lower surface 100 of the adjustment shaft 64, resulting in restricted gas flow from the pressure chamber 34 to the reserve chamber 90. The surfaces 98, 100 of the choke piston 74 and the adjustment shaft 64 may be textured or otherwise deformed to allow gas to slowly pass from the pressure chamber 34 to the reserve chamber 90. Alternatively, a textured washer or a washer made of permeable material, such as felt, may be located between the upper surface 98 of the choke piston 74 and the lower surface of the shaft 64. Conversely, when the pressure in the reserve chamber 90 is greater than the pressure chamber 34, the choke piston 74 is displaced downward against the retaining ring 76 whereby the upper surface 98 of the choke piston 74 and the lower surface 100 of the shaft 64 are separated, resulting in less restricted gas flow from the reserve chamber 90 back into the pressure chamber 48, as the retaining ring 76 is not circularly uniform. When the knob 62 is adjusted to change the travel, the pressures in the pressure chamber 34 and the reserve chamber 90 remain substantially equal as the amount of gas flow—even restricted gas flow from the pressure chamber to the reserve chamber—is sufficient to permit the pressures to equalize. However, under external impact loading, the flow path across the choke piston 74 from the pressure chamber to the reserve chamber—in this embodiment, between the surfaces 98, 100 of the choke piston and the shaft 64—becomes too restricted to equalize the pressures between the chambers in the short time frame of an external load. Accordingly, as the additional volume of the reserve chamber becomes unavailable during the short time frame of a sudden sharp external load, there is a resulting spike or increase in the spring rate that is desirable.

When the knob 62 is rotated in a first direction, the shaft 64 rotates the driver element 78, which in turn axially displaces the follower element 84 upward. The upward movement of the follower element 84 also displaces the connected piston tube 30, the bushing 61, the negative spring 60, and the compression piston assembly 33 upward. The upward movement of these parts reduces the relative distance between the inner tube bushing 50 and a compression bumper 104 located at the bottom of the outer tube 22, resulting in the travel of the fork 10 being reduced. The upward movement of the follower element 84 relative to the choke piston 74 also increases the volume of the reserve chamber 90 and decreases the volume of the pressure chamber 34. The combined volume of the reserve chamber 90 and pressure chamber 34 is also reduced by positioning the shaft 64 further into the pressure chamber 34, resulting in an increased spring rate.

When the knob 62 is rotated in a second direction, the shaft 64 rotates the driver element 78, which in turn axially displaces the follower element 84 downward. The downward movement of the follower element 84 also displaces the connected piston tube 30, the bushing 61, the negative spring 60, and the compression piston assembly 33 downward. The downward movement of these parts increases the relative distance between the inner tube bushing 50 and the compression bumper 104 located at the bottom of the outer tube 22, resulting in the travel of the fork 10 being increased. The downward movement of the follower element 84 relative to the choke piston 74 also decreases the volume of the reserve chamber 90 and increases the volume of the pressure chamber 34. The combined volume of the reserve chamber 90 and pressure chamber 34 is also increased by the further positioning of the shaft 64 out of the pressure chamber 34, resulting in a decreased spring rate.

As the travel of the fork 10 is being adjusted in either direction, gas flow—whether restricted or less restricted—is permitted between the pressure chamber 34 and the reserve chamber 90, such that the pressure in the pressure chamber 34 and the reserve chamber 90 remains substantially the same.

Figure 7:
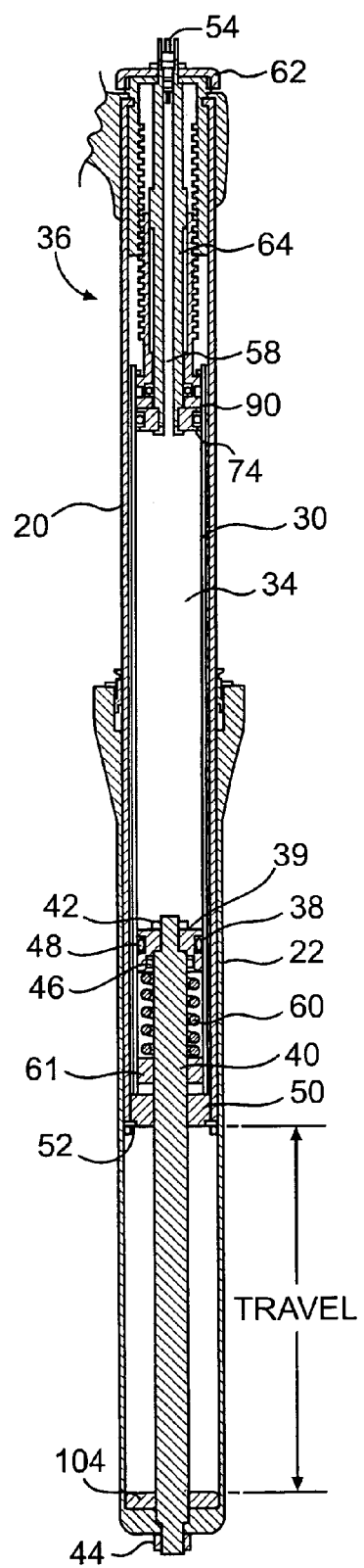
FIGS. 7–9 are cross-sectional views of the leg of the gas suspension system shown in FIG. 2, showing in particular, different travel settings of the fork.
Figure 8:
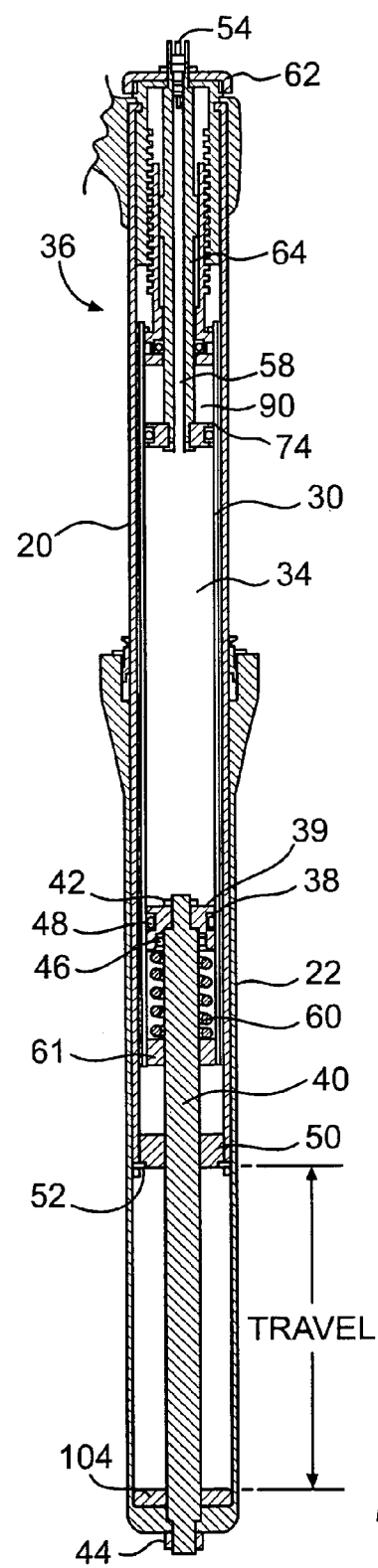
Figure 9:
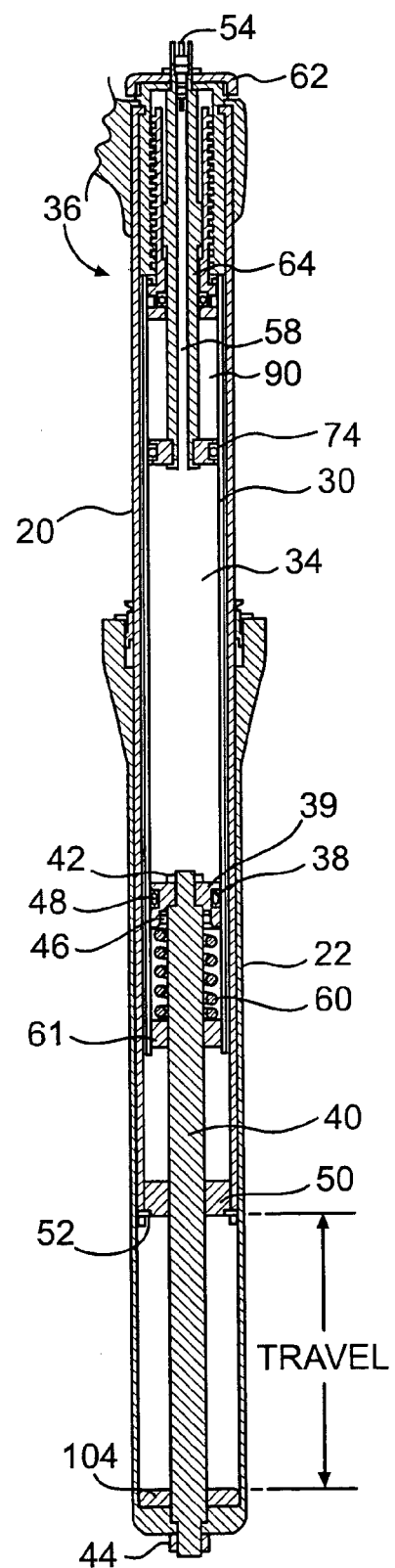

FIGS. 7–9 illustrate the suspension fork 10 adjusted to long, medium and short travel settings, respectively. It is desirable to have different spring rates for different travel settings. For example, for a shorter travel setting, a stiffer spring rate is desirable to prevent bottoming out of the fork. When the travel of the suspension fork is adjusted, the spring rate is simultaneously adjusted for the new travel setting. For example, when the travel of the fork 10 is reduced, the overall volume of the pressure chamber 34 is reduced, resulting in increased pressure in the pressure chamber 34 is reduced, resulting in increased pressure in the pressure chamber 34 and a corresponding increase in the spring rate. Likewise, when the travel of the fork 10 is increased, the overall volume of the pressure chamber 34 is increased, resulting in decreased pressure in the pressure chamber 34 and a corresponding decrease in the spring rate. Advantageously, a desirable spring rate may be achieved at any travel setting without having to externally adjust the gas pressure.

Figure 10:
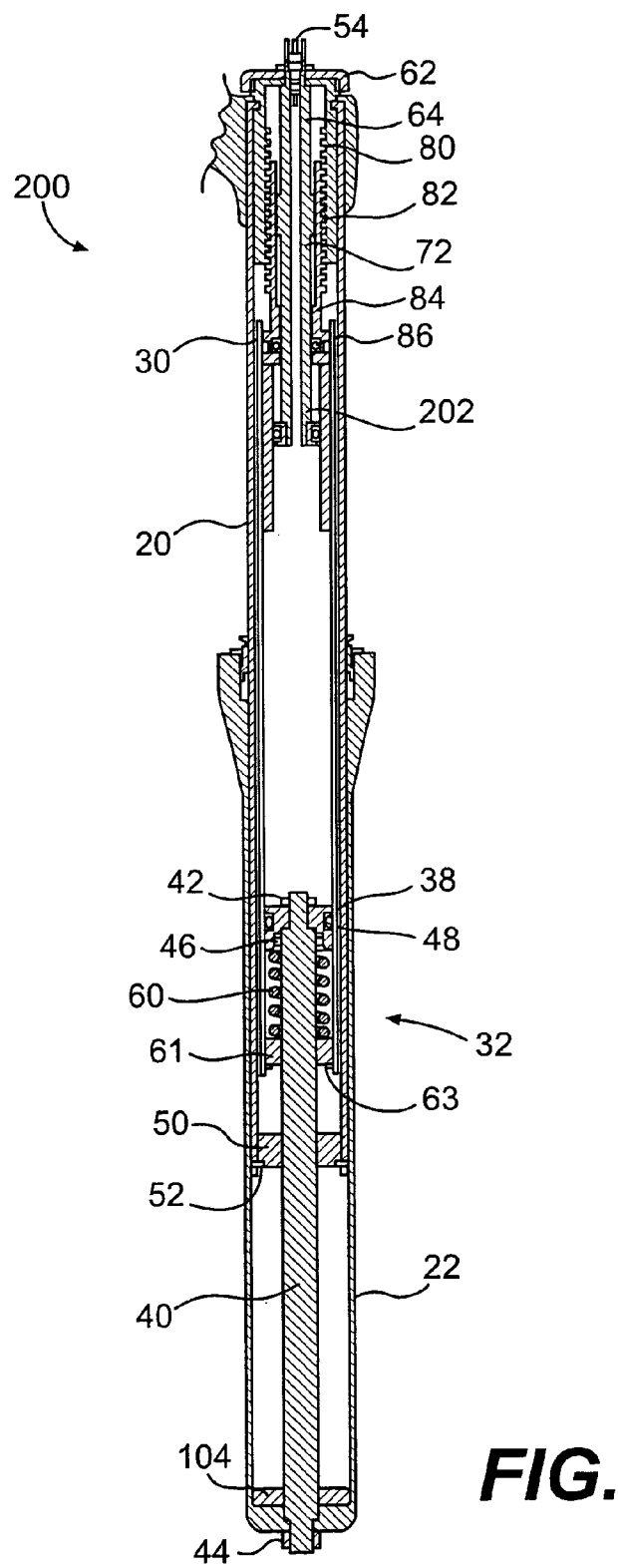
FIG. 10 is a cross-sectional view of another embodiment of the present invention.
Figure 11:
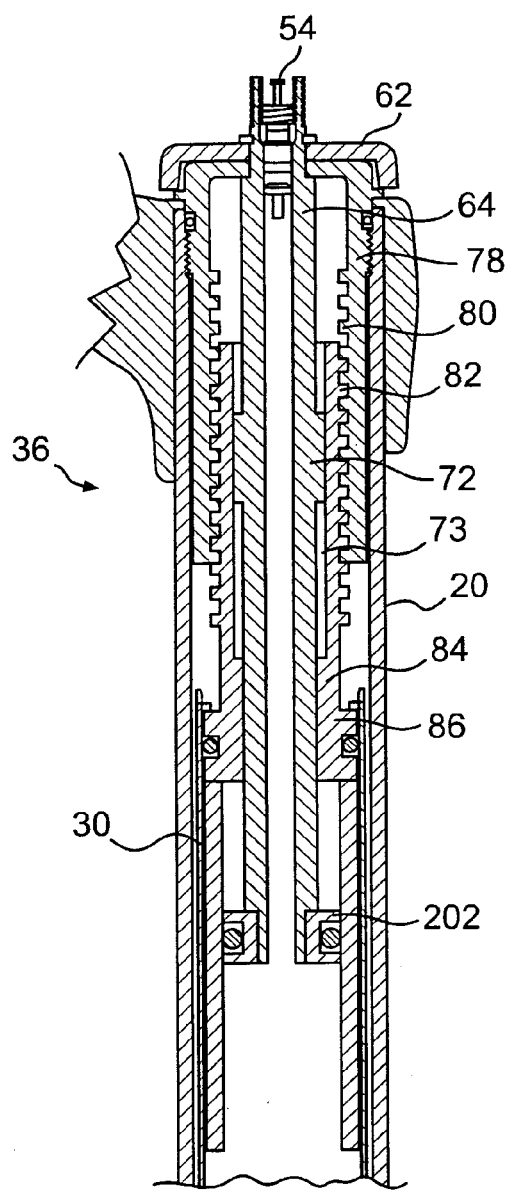
FIG. 11 is a partial cross-sectional view of an adjustment assembly shown in FIG. 10.

Looking to FIGS. 10–11, another embodiment of the present invention is depicted, similar to the embodiment of FIGS. 1–9, except that a gas suspension system 200 includes an extended adjustment shaft 202, and excludes a choke piston and a reserve chamber. In this embodiment, the larger adjustment shaft 202 displaces a larger volume of gas in the pressure chamber 34 resulting in a correspondingly larger change in the spring rate as the actuator 62 is adjusted.

Figure 12:
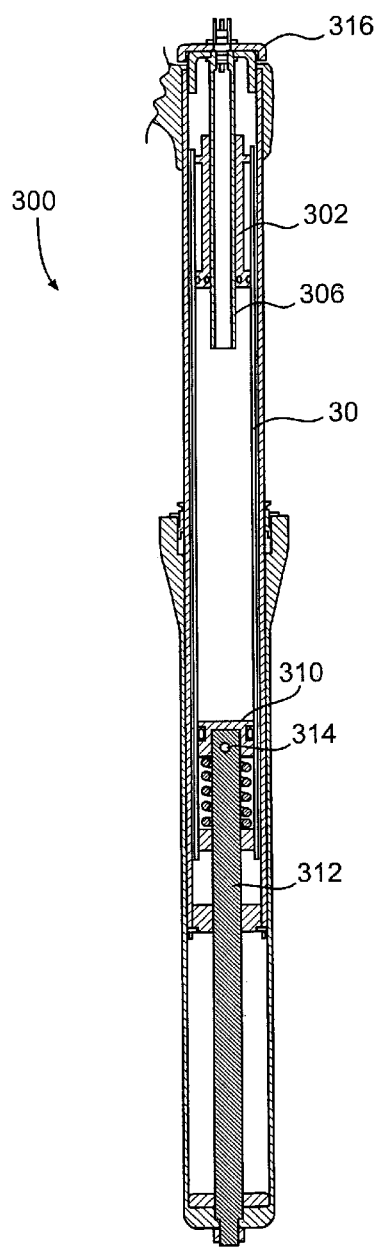
FIG. 12 is a cross-sectional view of yet another embodiment of the present invention.
Figure 13:
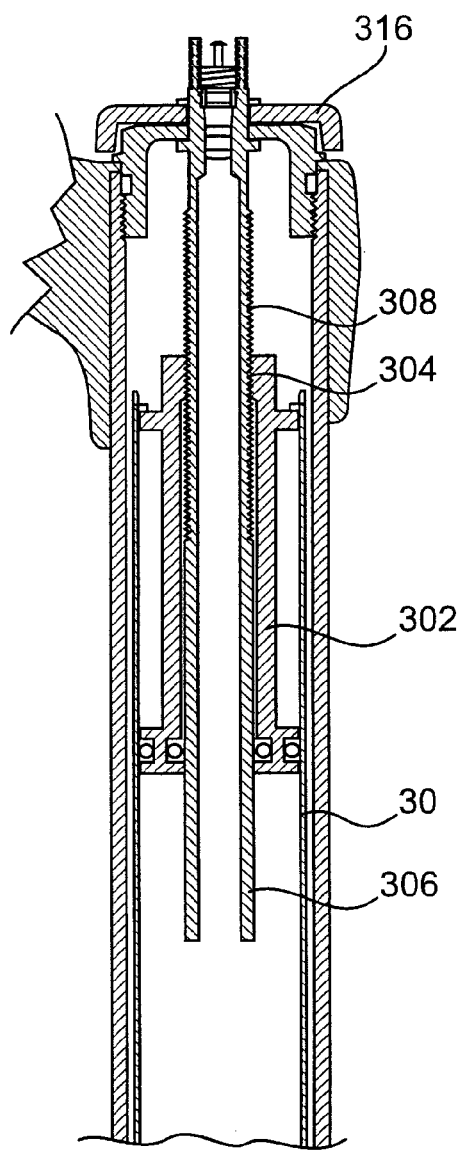
FIG. 13 is a partial cross-sectional view of an adjustment assembly shown in FIG. 12.

Looking to FIGS. 12–13, a further embodiment of the present invention is depicted, similar to the embodiment of FIGS. 1–9, except that it includes a follower element 302 with internal threads 304 matingly engaging an adjustment shaft 306 with external threads 308. This configuration may be easily adapted to include a choke piston and a reserve chamber as described in the previous embodiments of the present invention shown in FIGS. 1–11.

While this invention has been described by reference to several embodiments, it will be understood that numerous changes could be made within the spirit and scope of the inventive concepts described. Accordingly, it is intended that the invention not be limited to the disclosed embodiments, but that it include the full scope permitted by the language of the following claims.

What is claimed is:

1. A gas spring suspension system comprising:
   a frame;
   a pressure chamber;
   a compression piston assembly;
   an adjustment assembly associated with the frame;
   a piston tube operatively connected to the compression piston assembly,
   the compression piston assembly slidably displaceable along the piston tube to change the pressure in the pressure chamber,
   the adjustment assembly mechanically coupled to the piston tube and operable to axially displace the piston tube and the compression piston assembly relative to the frame to adjust a travel of the suspension system; and
   a shaft associated with the frame and configured to be variably positionable within the pressure chamber in response to axial displacement of the piston tube and the compression piston assembly by the adjustment assembly, the variable positioning of the shaft within the pressure chamber changing the pressure therein.

2. The suspension system of claim 1, wherein the adjustment assembly further comprises an actuator operable to position the adjustment assembly.

3. The suspension system of claim 2, wherein the adjustment assembly further comprises a driver element and a follower element; the driver element operably connected to and displaceable with the actuator to displace the follower element; the follower element operably connected to and displaceable with the piston tube.

4. The suspension system of claim 3, wherein the shaft forms the driver element.

5. The suspension system of claim 3, wherein the actuator comprises a rotatable knob and the driver element is threadably connected to the follower element, the driver element being rotatable with the knob to axially displace the follower element.

6. The suspension system of claim 5, wherein the knob is formed integrally with the driver element.

7. The suspension system of claim 5, further comprising a reserve chamber separated from the pressure chamber by a choke piston, the choke piston permitting restricted gas flow from the pressure chamber to the reserve chamber and less restricted gas flow from the reserve chamber to the pressure chamber.

8. The suspension system of claim 7, wherein the choke piston is attached to the shaft and configured to be slidably displaceable along the piston tube, the choke piston sealingly engaging the piston tube.

9. The suspension system of claim 5, further comprising a valve associated with the frame and the pressure chamber, the valve permitting external adjustment of the pressure within the pressure chamber.

10. The suspension system of claim 2, further comprising a reserve chamber separated from the pressure chamber by a choke piston, the choke piston permitting restricted gas flow from the pressure chamber to the reserve chamber and less restricted gas flow from the reserve chamber to the pressure chamber.

11. The suspension system of claim 10, wherein the choke piston is attached to the shaft and configured to be slidably displaceable along the piston tube, the choke piston sealingly engaging the piston tube.

12. The suspension system of claim 2, further comprising a valve associated with the frame and the pressure chamber, the valve permitting external adjustment of the pressure within the pressure chamber.

13. The suspension system of claim 1, further comprising a reserve chamber separated from the pressure chamber by a choke piston, the choke piston permitting restricted gas flow from the pressure chamber to the reserve chamber and less restricted gas flow from the reserve chamber to the pressure chamber.

14. The suspension system of claim 13, wherein the choke piston is attached to the shaft and configured to be slidably displaceable along the piston tube, the choke piston sealingly engaging the piston tube.

15. The suspension system of claim 1, further comprising a valve associated with the frame and the pressure chamber, the valve permitting external adjustment of the pressure within the pressure chamber.

* * * * *